Figure 1:
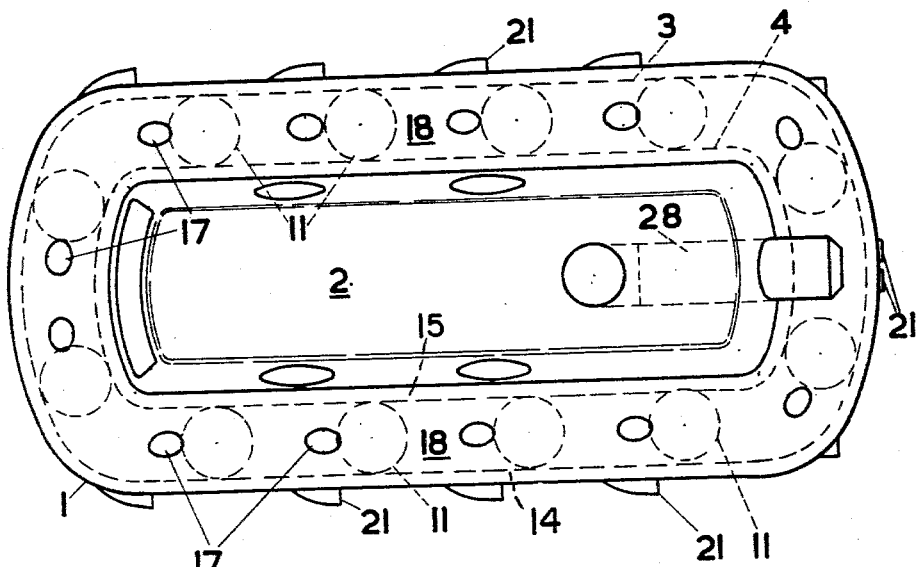

May 24, 1966  R. A. SHAW  3,252,534
GROUND EFFECT VEHICLE WITH PERIPHERALLY MOUNTED FANS
Filed Nov. 2, 1961  5 Sheets-Sheet 1

RONALD A. SHAW
Inventor

By
Cameron, Kerkam, & Sutton
Attorneys

May 24, 1966  R. A. SHAW  3,252,534
GROUND EFFECT VEHICLE WITH PERIPHERALLY MOUNTED FANS
Filed Nov. 2, 1961  5 Sheets-Sheet 3

RONALD A. SHAW
Inventor

By
Cameron, Kerkam, Sutton
Attorneys

May 24, 1966  R. A. SHAW  3,252,534
GROUND EFFECT VEHICLE WITH PERIPHERALLY MOUNTED FANS
Filed Nov. 2, 1961  5 Sheets-Sheet 4

RONALD A. SHAW
Inventor

By
Cameron, Kerkam & Sutton
Attorneys

May 24, 1966 R. A. SHAW 3,252,534
GROUND EFFECT VEHICLE WITH PERIPHERALLY MOUNTED FANS
Filed Nov. 2, 1961 5 Sheets-Sheet 5

Ronald A. Shaw
Inventor

By Cameron, Kerkam & Sutton
Attorneys

United States Patent Office 3,252,534
Patented May 24, 1966

3,252,534
GROUND EFFECT VEHICLE WITH PERIPH-
ERALLY MOUNTED FANS
Ronald Andrew Shaw, Felden, Hemel Hempstead, England, assignor to National Research Development Corporation, London, England
Filed Nov. 2, 1961, Ser. No. 149,558
Claims priority, application Great Britain, Nov. 3, 1960, 37,812/60
12 Claims. (Cl. 180—7)

This invention relates to airborne vehicles of the type capable of being sustained in flight by the ground cushion effect of a downwardly directed curtain of fluid extending continuously around the periphery of the vehicle. Such vehicles are commonly referred to as "hovercraft."

At the present time, the design of "hovercraft" is largely based on the use of one or two centrally placed fans which supply air to the peripheral nozzle or nozzles for discharge of the curtain or curtains through a ducting system which unavoidably gives rise to considerable loss. The present invention involves the use of a number of fans distributed around the periphery of the vehicle so that duct lengths are kept to a minimum.

According to the invention there is provided an airborne vehicle having in its undersurface a downwardly directed peripherally extending nozzle divided in a peripheral sense into a plurality of sections, and comprising a plurality of fans distributed around the periphery of the vehicle, each fan being connected to supply air to a separate section of the nozzle and the nozzle being shaped to discharge the air as a curtain extending continuously around the periphery of the vehicle.

According to a feature of the invention each section of the nozzle is provided with an ejector device having a connection to a source of compressed air. The ejector of any section of the nozzle may be brought into use to maintain the continuity of the air curtain in the event of failure of the fan supplying that section. The source of compressed air may be the compressor or compressors of one or more gas turbine engines driving the fans.

In one form of the invention, the fans are of the centrifugal type. There may be two nozzles as aforesaid and each fan may have two outlets connected to supply sections of the outer and inner nozzles. Each fan may be driven by an individual gas turbine engine, the engines being distributed around the periphery of the vehicle.

In another form of the invention, the fans are of the axial flow type and have turbine rotor blades mounted on the tips of the fan rotor blades. These turbine blades may be driven by working fluid, e.g., compressed air or turbine exhaust gases, from one or more gas turbine engines.

Figure 2:
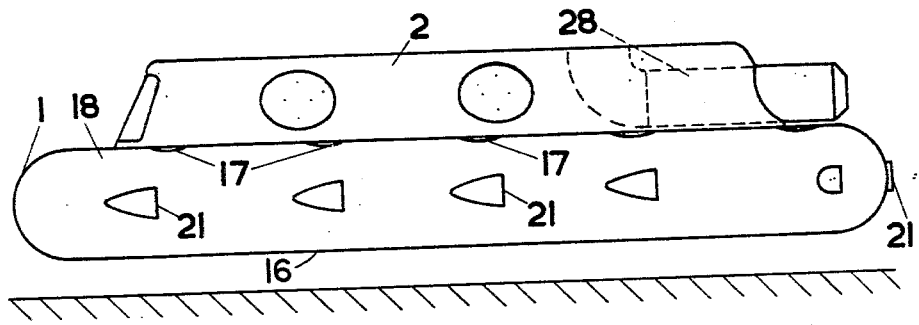
Figure 3:
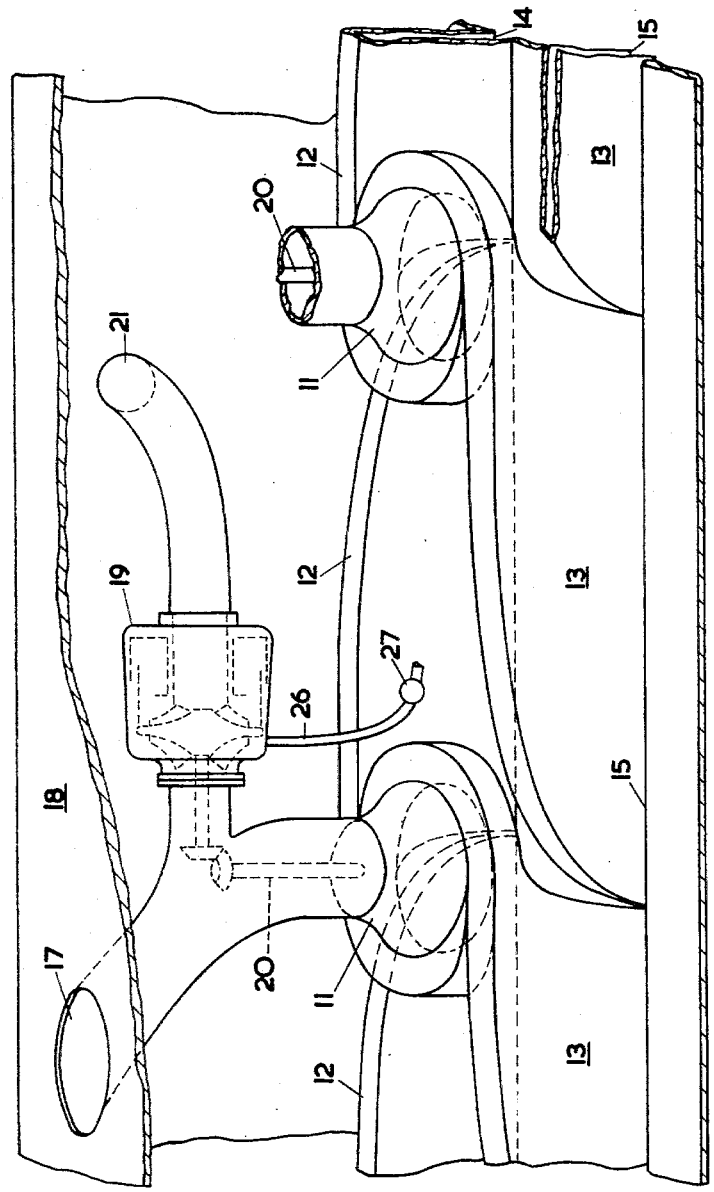
Figure 4:
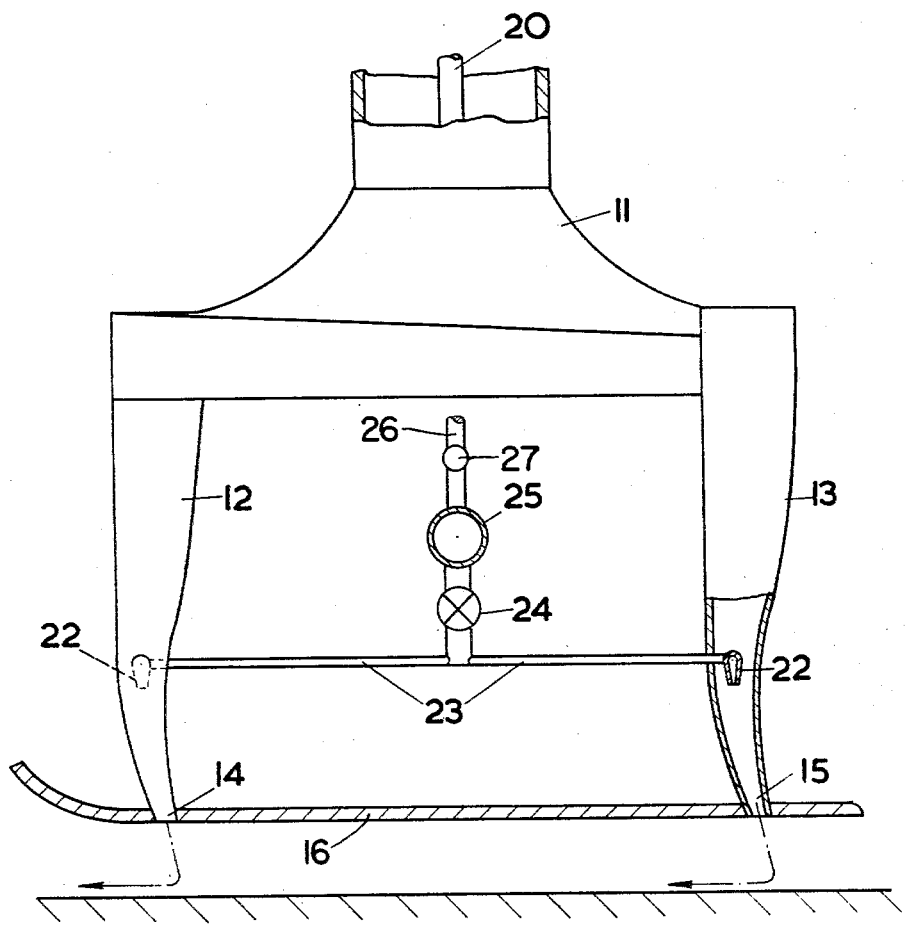
Figure 5:
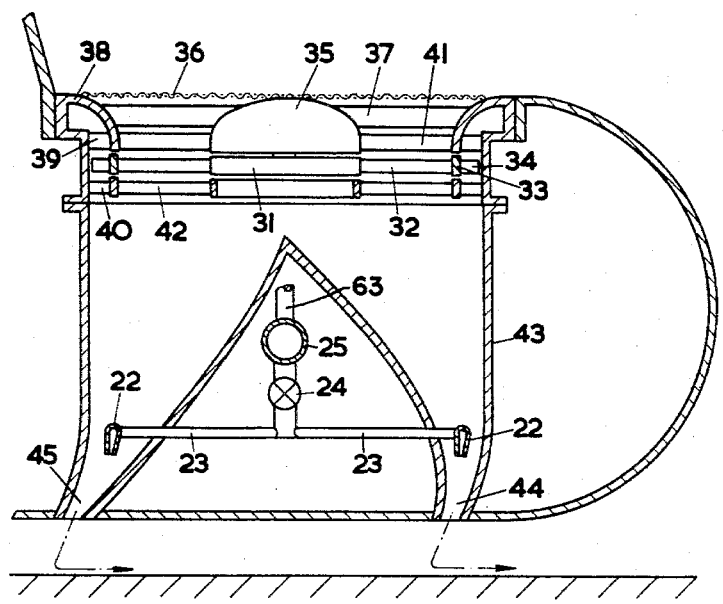
Figure 6:
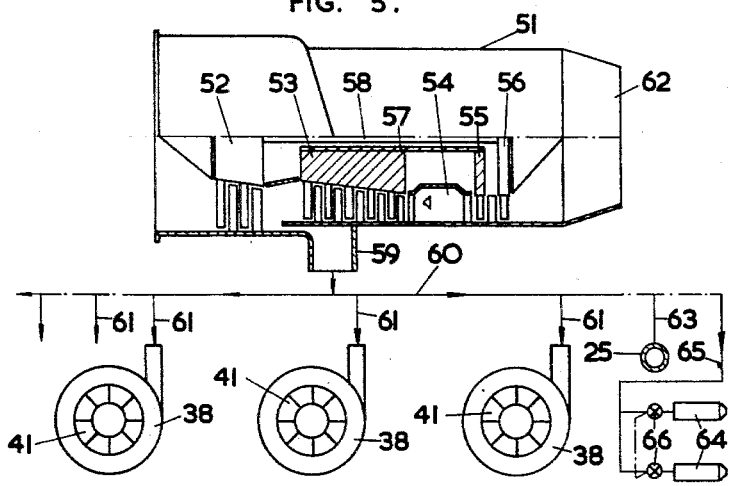
Figure 7:
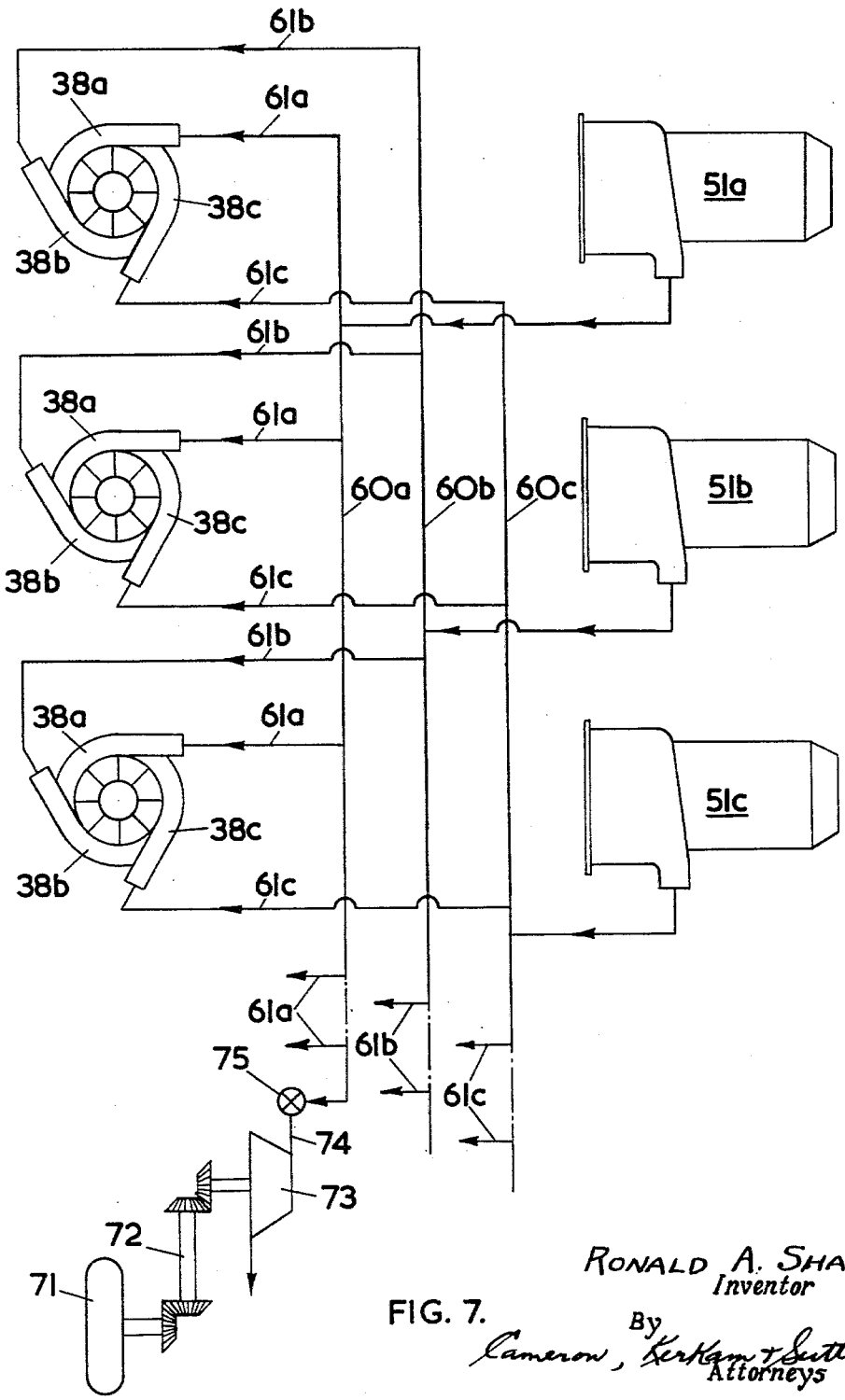

Some embodiments of the invention will now be described by way of example with reference to the accompanying drawings, of which:

FIGURES 1 and 2 are respectively plan and side views of a vehicle of the "hovercraft" type having centrifugal fans, FIGURE 3 is a view of part of the interior of the vehicle showing two of the centrifugal fans and the associated ducting, FIGURE 4 shows one of the centrifugal fans viewed longitudinally of the vehicle, FIGURE 5 is a sectional view of part of an alternative form of the vehicle of FIGURES 1 and 2, having axial flow fans, FIGURE 6 is a schematic view showing the driving system for the axial flow fans of the vehicle of FIGURE 5, FIGURE 7 is a schematic view of an alternative driving system.

Referring to FIGURES 1 and 2 the vehicle comprises a platform or body 1 which in plan is of elongated configuration, and is surmounted by a cabin 2. As shown in FIGURE 2, the vehicle is intended for travel at a height above the ground (or water) of not more than a few feet.

Mounted within the body are a number of, in this particular example, twelve, centrifugal fans 11 evenly distributed around its periphery. Two of these fans are shown in FIGURE 3. The impeller of each fan is mounted with its axis generally vertical in a casing having two diffuser outlet ducts 12, 13 at diametrically opposite positions on outboard and inboard sides of the fan respectively, these ducts extending in opposite directions generally tangentially of the fan and peripherally of the vehicle. The ducts lie initially in a plane normal to the fan axis but are shaped to bend downwardly and terminate in long narrow discharge apertures 14, 15 which extend peripherally of the vehicle. The apertures are directed downwardly and somewhat inwardly towards the centre of the vehicle (as shown in FIGURE 4). The discharge apertures 14 of the outboard diffuser ducts 12 are contiguous at their ends and constitute sections of a downwardly directed nozzle in the undersurface 16 of the vehicle extending continuously around its periphery. Similarly the discharge apertures 15 of the inboard diffuser ducts 13 constitute sections of a second downwardly directed nozzle extending continuously around the vehicle somewhat inboard of the first-mentioned nozzle. The outboard and inboard nozzles are indicated at 3 and 4 in FIGURE 1, and it will be seen that, regarding the vehicle in plan, the fans lie generally between the nozzles.

The fans are connected to draw in air through inlet apertures 17 in the upper surface 18 of the vehicle, and each fan is driven by a compact gas turbine engine 19 comprising a centrifugal compressor, an annular combustion system and a radial flow turbine driving the compressor. The engine is connected to drive the centrifugal fan 11 through a transmission 20, and it draws its air from the inlet to the fan and discharges its exhaust gas stream through a rearwardly directed exhaust nozzle 21 in the side of the vehicle.

In operation the fans are driven by the engines 19 to draw in air and discharge it downwardly and inwardly through the nozzle apertures 14, 15 as outboard and inboard curtains extending continuously around the vehicle as indicated in FIGURE 4. These curtains give rise to a ground cushion effect whereby the vehicle is supported.

Referring now to FIGURE 4, each of the diffuser ducts 12, 13 is provided with an ejector device 22 mounted centrally (or in the side wall) upstream of the discharge apertures 14, 15. These ejectors are connected by pipes 23 and valve 24 to a common manifold 25 extending around the vehicle. As shown in FIGURE 3 each of the gas turbine engines 19 has a bleed connection 26 from its compressor for leading compressed air to the manifold, the connection including a nonreturn valve 27. In the event of failure of a fan or its driving engine, the valve 24 for the ejectors in the outlet of that fan is opened to supply compressed air thereto. The air from the ejectors induces an air flow in the diffuser ducts whereby continuity of the peripheral air curtains is maintained, so that the ground cushion effect and lift on the vehicle is not lost.

Forward propulsion of the vehicle is provided by the rearward discharge of the engine efflux through nozzles 21. In addition a separate rearwardly discharging jet engine 28, or an engine driven propeller, may be provided.

A second embodiment is generally similar in appearance to that shown in FIGS. 1 and 2, but has a number of, say, twelve, axial flow fans evenly distributed around the vehicle periphery with their axes substantially vertical. One such fan is shown in FIGURE 5. It comprises a rotor 31 having a row of axial flow fan rotor blades 32 mounted thereon, the fan blade tips being connected by a shroud ring 33 with a row of axial flow turbine rotor blades 34 carried on its outer surface. The fan rotor is supported in bearings carried in a fairing 35 supported centrally within the fan intake 36 by struts 37. The turbine rotor blades are associated with an inlet volute 38 and turbine inlet nozzle vanes 39, while there is a further row of axial flow turbine stator blades 40 downstream of the rotor blades 34. Rows of axial flow fans stator blades 41, 42 are provided upstream and downstream of the fan rotor blades 32.

Similar fans are disclosed in prior British Patent specifications Nos. 834,800 and 839,977, corresponding to U.S. Patent Nos. 2,940,689 and 2,039,649, respectively.

The fan and turbine blades are arranged to discharge into a bifurcated outlet duct 43, each branch of which progressively changes in shape to terminate in a long narrow discharge aperture 44, 45 in a vehicle undersurface. The inner and outer apertures associated with the individual fans are contiguous at their ends and constitute sections of inboard and outboard nozzles extending continuously peripherally of the vehicle as in the previously described embodiment. The nozzles are somewhat inclined to discharge with an inwardly directed component towards the centre of the vehicle as shown in FIGURE 5.

The vehicle is powered by a gas turbine jet propulsion engine 51 (see FIGURE 6) which may be mounted in the same way as the engine 28 of the previously described embodiment. The engine is of the by-pass type comprising coaxial low and high pressure compressors 52, 53, a combustion system 54, and high and low pressure turbines 55, 56 connected to drive the high and low pressure compressors respectively through coaxial shafts 57, 58. The low pressure compressor is connected to deliver part of its output to the high pressure compressor and part to an outlet volute 59. This volute is connected to manifold 60 from which branches 61 lead to the inlet volutes 38 of the twelve fans. The turbine exhaust stream of the engine is discharged rearwardly through jet nozzle 62 to afford forward propulsion.

In operation the compressed air from the engine drives the fans which draw in air through their inlets 36 in the upper surface of the vehicle. This air, together with the turbine-driving air, is discharged downwardly and inwardly as continuous inboard and outboard curtains through the peripheral nozzles. In this way a ground cushion effect is generated whereby the vehicle is supported when close to the ground.

Each section of the peripheral nozzles is provided with ejectors 22 connected through pipes 23 and valve 24 to common manifold 25 as described with reference to FIGURE 4. The manifold 25 is in this case supplied with compressed air through a further branch 63 from manifold 60.

The vehicle is also provided on opposite sides with a pair of rearwardly directed jet nozzles 64 supplied with air from the engine through a branch 65 from manifold 60, these branches including linked valves 66. Directional control and the vehicle can be achieved by differential operation of the valves 66.

The vehicle just described may be modified as shown in FIGURE 7 so that it is capable of free flight, i.e., flight outside the ground cushion, and of road operation. In this case a number of, say, three gas turbine engines 51a, 51b, 51c are provided, each being similar to engine 51 of FIGURE 6. The turbine inlet volute of each fan is divided into three separate sections 38a, 38b, 38c, each providing for one third admission.

The engines have their low pressure compressors connected to manifold 60a, 60b, 60c respectively, and each manifold is connected by branches 61a, 61b, 61c one to a separate section of each fan inlet volute. Thus each engine can supply a third of the turbine inlet to each fan. For operation within the ground cushion only one engine, say, engine 51a is in use, if necessary at reduced power, while for free flight all the engines are in use so that the air streams discharged by the fans afford sufficient direct jet lift to support the vehicle.

For road operation, the vehicle is provided with wheels, preferably a pair of wheels arranged in tandem on the vehicle centre line as described in copending U.S. application Serial No. 57,455, filed September 21, 1960, corresponding to British patent application No. 32,752/59. One or both of these wheels 71 is connected through a transmission 72 to be driven by an air turbine 73 to which air from engine 51a is supplied through a branch 74 from manifold 60a this branch including a valve 75.

In one alternative arrangement to that of FIGURE 7 the vehicle is powered by two alternatively operable engines, one driving a compressor of relatively small output for use during operation on the road and within the ground cushion, and the other driving a compressor of relatively large output for use in free flight. In this respect the driving system of the vehicle may be similar to that described in the copending application referred to.

In the embodiments of FIGURES 5 and 6 or FIGURE 7, the turbine inlet volutes of the fans might alternatively be supplied with turbine exhaust gases from the gas turbine engine or engines.

I claim:

1. An airborne vehicle having in its undersurface a first downwardly directed peripherally extending nozzle divided in a peripheral sense into a plurality of sections, and a second downwardly directed nozzle extending around the vehicle inboard of said first nozzle and also divided in a peripheral sense into a plurality of sections, and comprising a plurality of fans distributed around the periphery of the vehicle, and means for driving said fans, each fan being connected to supply air to a separate section of said first nozzle and to a separate section of said second nozzle, each of said nozzles being shaped to discharge the air as a curtain extending continuously around the periphery of the vehicle, the curtain discharged from said second nozzle being inboard of the curtain discharged from said first nozzle.

2. A vehicle according to claim 1 wherein the means for driving said fans comprises a single gas turbine engine connected to drive all of the fans.

3. A vehicle according to claim 1 wherein the means for driving said fans comprises a plurality of gas turbine engines distributed around the periphery of the vehicle, one engine being connected to drive each fan.

4. A vehicle according to claim 1 wherein each fan is of the centrifugal type.

5. A vehicle according to claim 1 wherein the fans are of the centrifugal type and are mounted with their axes generally vertical, and each fan has two oppositely extending outlet ducts, one of said two outlet ducts being connected to supply a section of said first nozzle and the other outlet duct being connected to supply a section of said second nozzle.

6. A vehicle according to claim 1 wherein each fan is of the axial flow type.

7. A vehicle according to claim 6 wherein each fan has a row of fan rotor blades and a row of turbine rotor blades in driving connection with the fan rotor blades, and wherein the means for driving said fans comprises a gas turbine engine connected to supply working fluid to drive the turbine rotor blades.

8. A vehicle according to claim 7 wherein the turbine rotor blades are mounted on the tips of the fan rotor blades.

9. A vehicle according to claim 6 wherein each fan has a row of fan rotor blades and a row of turbine rotor blades in driving connection with the fan rotor blades and the inlet to the turbine blades of each fan is divided into a plurality of sections, and wherein the means for driving said fans comprises a plurality of gas turbine engines each connected to supply working fluid to a separate section of the inlet of each fan.

10. An airborne vehicle having in its undersurface a downwardly directed peripheral nozzle divided in a peripheral sense into a plurality of sections, and comprising a plurality of fans distributed around the periphery of the vehicle, each fan being connected to supply air to a separate section of the nozzle, the nozzle being shaped to discharge the air as a curtain extending continuously around the periphery of the vehicle, an ejector device associated with each of said nozzle sections, a plurality of gas turbine engines distributed around the periphery of the vehicle, one engine being connected to drive each fan, and a common manifold to which all of the ejector devices are connected, each engine comprising a compressor connected to supply compressed air to the common manifold through non-return valves.

11. An airborne vehicle having in its undersurface a downwardly directed peripheral nozzle divided in a peripheral sense into a plurality of sections, and comprising a plurality of fans distributed around the periphery of the vehicle, means for driving said fans, each fan being connected to supply air to a separate section of the nozzle, the nozzle being shaped to discharge the air as a curtain extending continuously around the periphery of the vehicle, an ejector device associated with each of said nozzle sections, and means for supplying compressed air to the ejector device associated with any nozzle section in the event of failure of the fan supplying air to said section.

12. A vehicle according to claim 11 wherein the means for driving said fans comprises a single gas turbine engine connected to drive all of the fans.

References Cited by the Examiner

UNITED STATES PATENTS

| | | | |
|---|---|---|---|
| 1,621,625 | 3/1927 | Casey | 180—7 |
| 2,922,277 | 1/1960 | Bertin | 180—7 |
| 2,939,649 | 6/1960 | Shaw | 180—7 |
| 3,018,068 | 1/1962 | Frost. | |
| 3,039,550 | 6/1962 | Beardsley | 180—7 |
| 3,130,804 | 4/1964 | Bertin | 180—7 |

FOREIGN PATENTS

| | | |
|---|---|---|
| 229,914 | 8/1960 | Australia. |
| 1,238,499 | 7/1960 | France. |

A. HARRY LEVY, *Primary Examiner.*